No. 720,738. PATENTED FEB. 17, 1903.
G. P. RITTER.
CAR COUPLING.
APPLICATION FILED NOV. 26, 1902.
NO MODEL. 4 SHEETS—SHEET 1.

Witnesses
Inventor

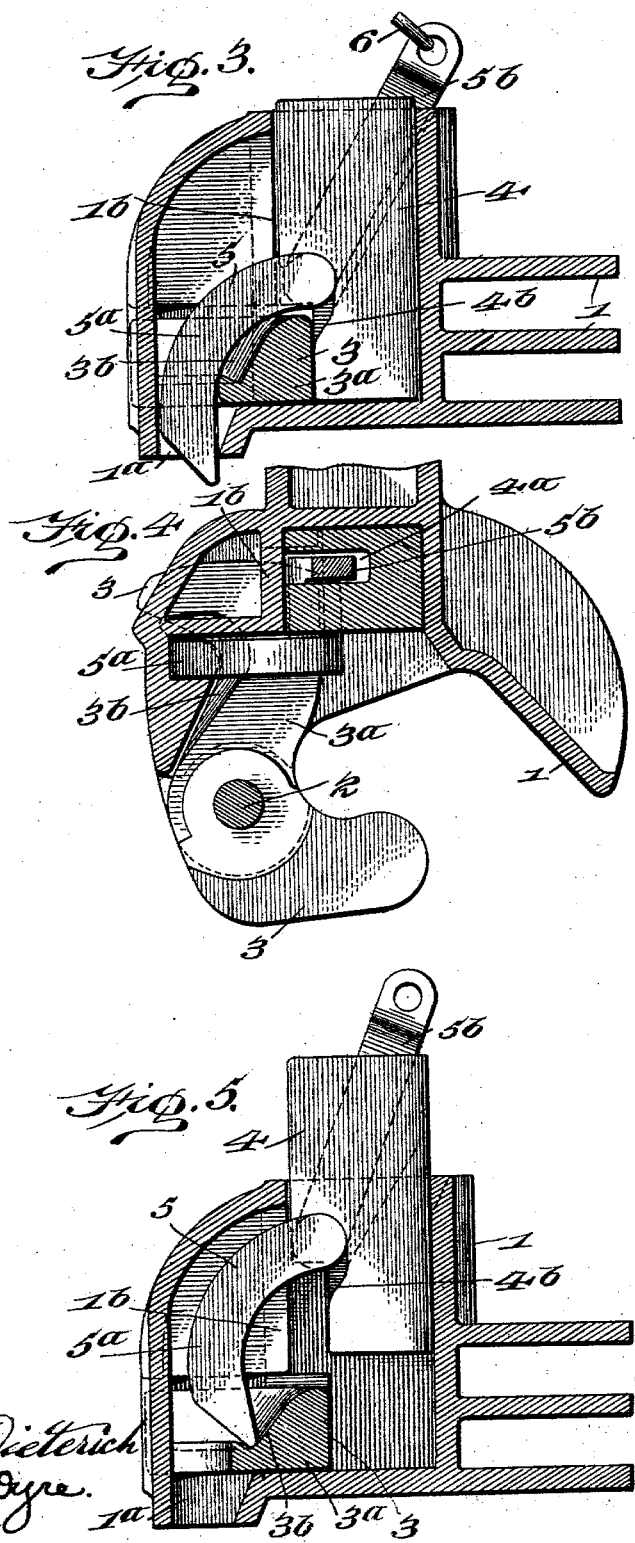

No. 720,738. PATENTED FEB. 17, 1903.
G. P. RITTER.
CAR COUPLING.
APPLICATION FILED NOV. 26, 1902.
NO MODEL. 4 SHEETS—SHEET 3.

Witnesses

Inventor

No. 720,738. PATENTED FEB. 17, 1903.
G. P. RITTER.
CAR COUPLING.
APPLICATION FILED NOV. 26, 1902.
NO MODEL. 4 SHEETS—SHEET 4.
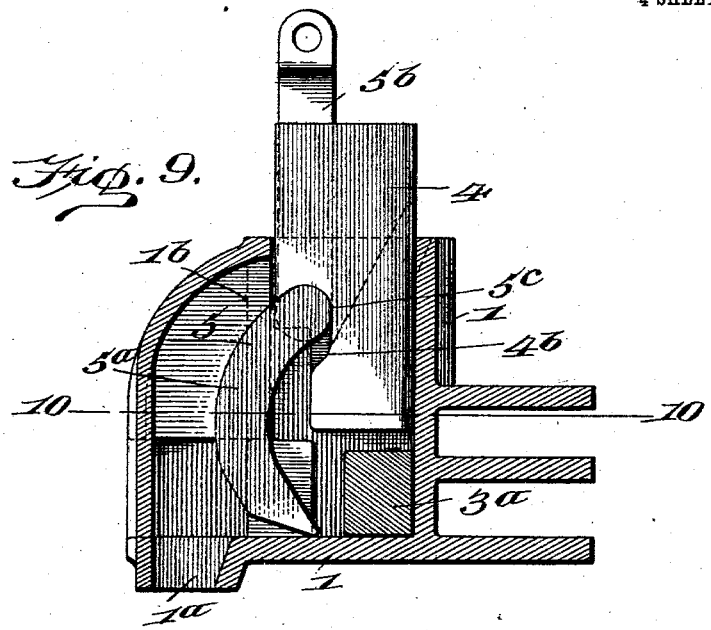
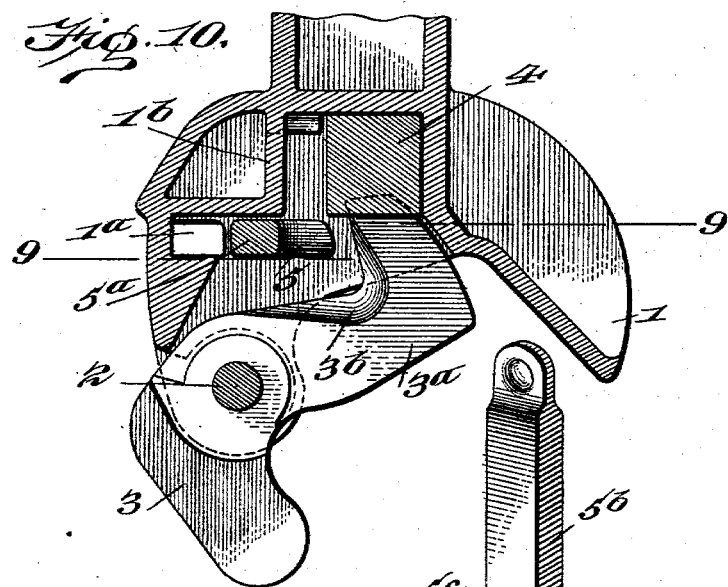
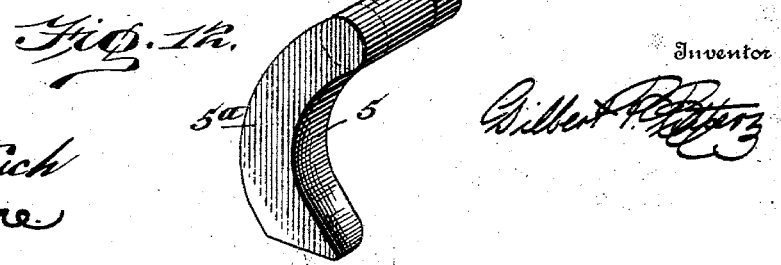

UNITED STATES PATENT OFFICE.

GILBERT P. RITTER, OF CHICAGO, ILLINOIS.

CAR-COUPLING.

SPECIFICATION forming part of Letters Patent No. 720,738, dated February 17, 1903.

Application filed November 26, 1902. Serial No. 132,933. (No model.)

*To all whom it may concern:*

Be it known that I, GILBERT P. RITTER, a citizen of the United States, residing at Chicago, in the county of Cook, State of Illinois, have invented certain new and useful Improvements in Car-Couplers; and I hereby declare the following to be a full, clear, and exact description of the same, reference being had to the accompanying drawings, in which—

Figure 1:
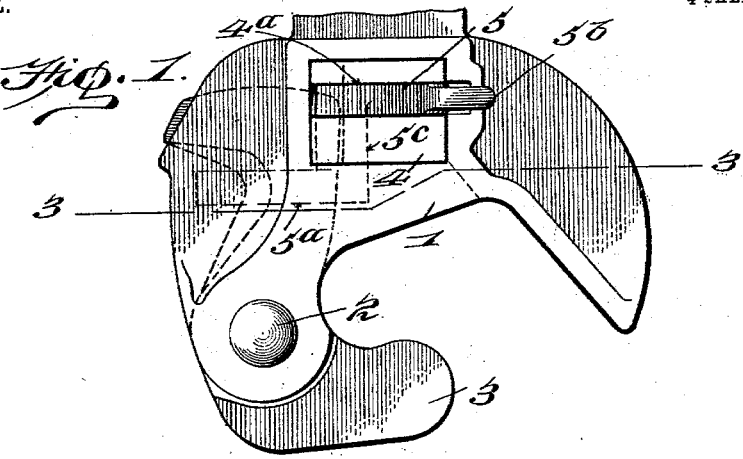
Figure 2:
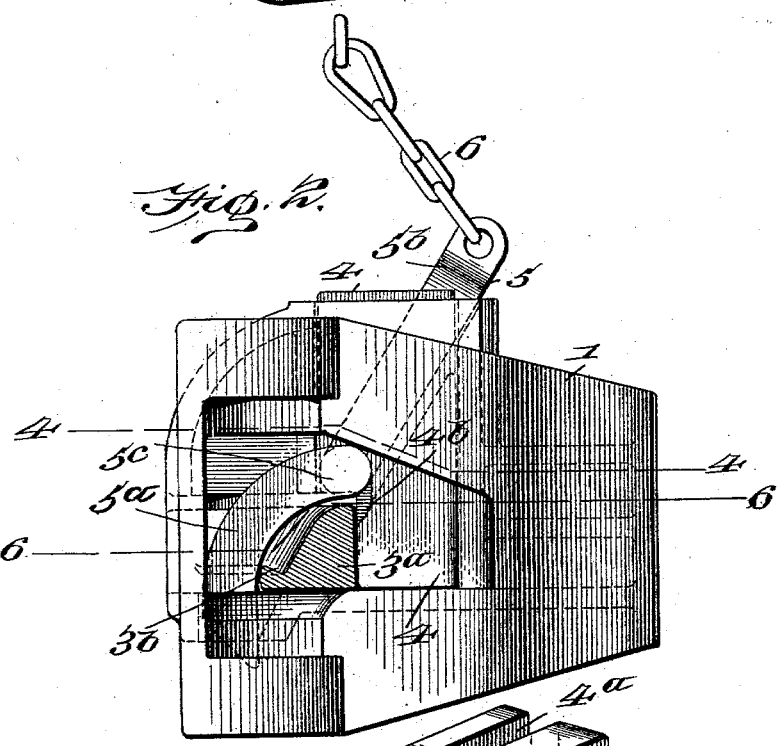
Figure 3:
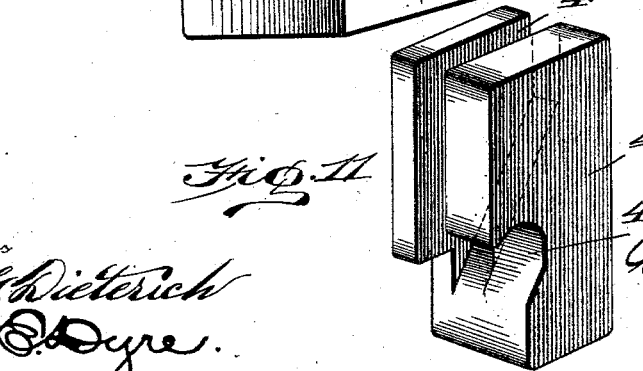
Figure 6:
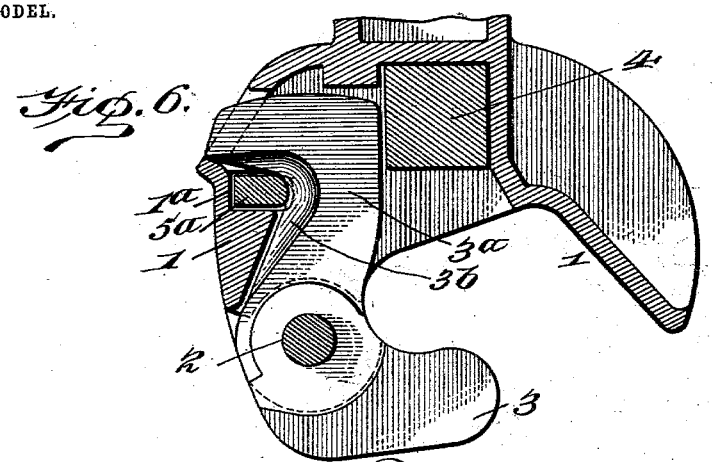
Figure 7:
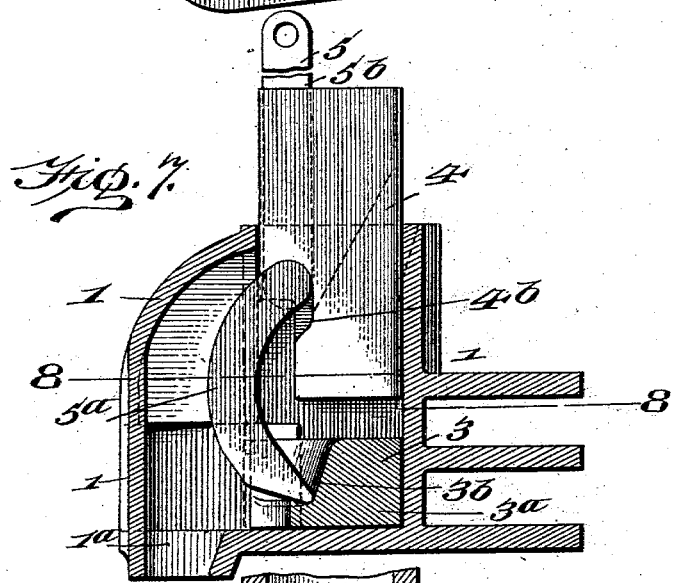
Figure 8:
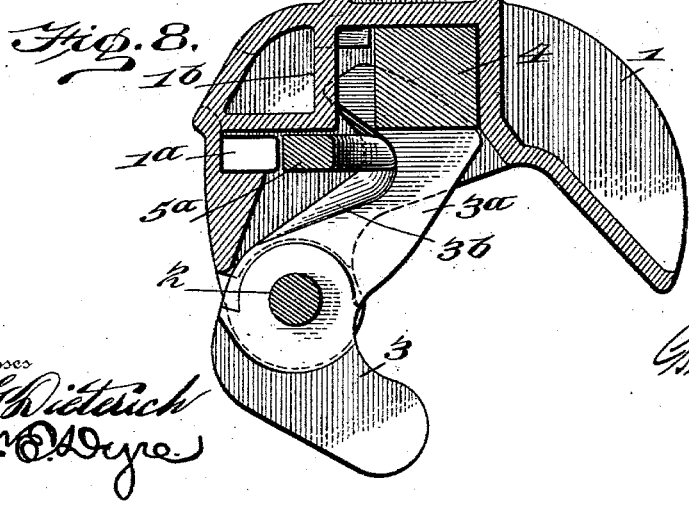

Figure 1 is a top plan view of a coupler embodying my invention, the knuckle in a locked position and portions of the knuckle and the lock-set and knuckle-opener member being shown in dotted lines. Fig. 2 is a front elevation, the external part of the knuckle in front of the lock-set and knuckle-opener member removed, the parts being shown in a locked position. Fig. 3 is a section on the line 3 3, Fig. 1, also showing the parts in a locked position. Fig. 4 is a section on the line 4 4, Fig. 2. Fig. 5 is a view similar to Fig. 3, the lock-set member resting on the tail of the knuckle and the lock supported in an unlocked position. Fig. 6 is a section on the line 6 6, Fig. 2. Fig. 7 is a view similar to Figs. 3 and 5, showing the relative position of the parts when the knuckle is partly open, as shown in Fig. 8. Fig. 8 is a section on the line 8 8, Fig. 7. Fig. 9 is a section on the line 9 9, Fig. 10, showing the lock-set and knuckle-opener member resting on the bottom wall of the coupler-head when the knuckle is fully open, as shown in Fig. 10. Fig. 10 is a horizontal section on the line 10 10, Fig. 9, showing the relative positions of the parts when the knuckle is fully open. Fig. 11 is a perspective view of the lock. Fig. 12 is a perspective view of the lock-set and knuckle-opener member.

Like symbols refer to like parts wherever they occur.

My invention relates to the gravity-lock mechanism and its adjuncts of car-couplers of the vertical-plane or Janney type, and has for its objects to produce a lock-set, a knuckle-opener, and a lock to the lock, all efficient and positive in operation and simple in construction.

To this end the primary object of my invention is to provide a knuckle-controlled lock-set for supporting the lock in an unlocked position and which cannot be accidentally operated by any less-extended vibration of the knuckle than would result in a positive uncoupling of the cars; and this feature of my invention embraces the combination, with the gravity-lock and the knuckle of a vertical-plane coupler, of a lock-set adapted to engage the gravity-lock and to rest upon and travel with the tailpiece of the knuckle, the gravity-lock being thereby supported above and out of contact with the knuckle.

A further object of my invention is such a construction of the gravity-lock and lock-set that the latter shall serve as a lock to the gravity-lock when the latter is in its locked position, and this feature of my invention embraces the combination, with the knuckle of a vertical-plane coupler, of a gravity-lock having a cam-recess, a vibrating lock-set having a cam portion adapted to slide and rotate in the cam-recess of the lock and to engage with a wall of the coupler.

There are other minor features of invention, all as will hereinafter more fully appear.

I will now proceed to describe my invention more fully, so that others skilled in the art to which it appertains may apply the same.

In the drawings, 1 is a coupler-head having an opening $1^a$ in the bottom wall thereof to receive the lower end of the lock-set and knuckle-opener member when the parts are in a locked position and also provided with an interior wall $1^b$, which coacts with the cam portion of the lock-set member and the lock to secure the latter in a locked position.

Pivoted to the coupler-head 1 by the knuckle-pin 2 is the knuckle 3, the tailpiece $3^a$ of which is provided on the side opposite the lock with a depressed seat $3^b$, adapted to receive the lower end of the lock-set member when the lock is set for uncoupling.

The gravity-lock 4 has a bifurcating-slot $4^a$, in which the upper or lock-lifting arm of the lock-set and knuckle-opener member vibrates when the lock is set and the knuckle opens, and the lock 4 is also provided on its face adjacent to the knuckle with a cam-recess $4^b$, having its upper surface in the form of a segment of a cylinder and being wider above than below, said cam-recess being adapted to receive the cam portion of the lock-set and knuckle-opener member and to permit of the sliding and rotation of the latter relatively to the lock as well as absolutely.

5 is the lock-set and knuckle-opener member, having a curved lower arm $5^a$, which rests upon and in the depressed seat $3^b$ of the knuckle-tail and which rides forward with the said knuckle-tail $3^a$ in its outward travel after the lock is raised and set in an unlocked position, said lock-set and knuckle-opener member 5 having an upper lifting-arm $5^b$, which passes through the slot $4^a$ of the lock 4 and is attached at its upper end by a chain 6 to the usual and well-known uncoupling-lever. The lower arm $5^a$ and upper arm $5^b$ are rigidly connected by an intermediate cylindrical cam or journal portion $5^c$, which engages the lock 4 within the cam-recess $4^b$.

It will be noted that on account of the curve of the lower arm $5^a$ of the lock-set and knuckle-opener member 5 and its relation to the coupler-head (see Fig. 3) it is impossible to push the lock 4 upward without first withdrawing the arm $5^a$ from the opening $1^a$ in the bottom wall of the coupler, as any independent upward movement of the lock will move the arm $5^a$ eccentrically, thus causing said arm $5^a$ to constitute a second lock to the lock in addition to the cam-lock $5^c$.

The construction being substantially such as herein pointed out, the operation of the device will be as follows: The parts being in a locked position, as shown in Figs. 1, 2, 3, 4, and 6, an upward pull upon the chain 6 will cause the lock-set and knuckle-opener member 5 and the lock 4 to rise in cluster, and when the arm $5^a$ of the member 5 is withdrawn from the opening $1^a$ in the bottom wall of the coupler-head 1 and passes above the rear edge of the depressed seat $3^b$ of the knuckle-tail $3^a$ it rotates on account of the tendency of the lifting-arm to assume a vertical position, (see Fig. 5,) and upon releasing the pull upon the chain the lower end of the arm $5^a$ seats itself upon the depressed seat $3^b$ of the knuckle-tail $3^a$, thus supporting the lock 4 in an unlocked position. The lock-set and knuckle-opener member 5 and the lock 4 being in this latter position, the lock-set rides or travels with the tail of the knuckle until such time as the lifting-arm $5^b$ contacts the coupler-head, (see Fig. 7,) when any further outward movement of the knuckle will positively unseat the lock-set (see Fig. 9) and cause it to seat itself on the bottom wall of the coupler. It will be noted that in the construction herein shown and described the upper wall of the coupler-head acts as a stop to engage the lifting-arm $5^b$ and is the means of unseating the lock-set from the tailpiece of the knuckle and permitting the lock-set member $5^a$ to seat itself on the bottom wall of the coupler; but any equivalent stop which arrests the travel of the lock-set with the tail of the knuckle will serve as a means for unseating said lock-set and knuckle-opener member. Upon the inward or coupling movement of the knuckle the arm $5^a$ is swept back into its locked position by the knuckle-tail $3^a$, thus permitting the lock 4 to drop in front of the knuckle-tail $3^a$, at which time all the parts are in their locked position. It will thus be seen that the knuckle positively actuates and controls the action of the lock-set member, except as to the primary manual setting of the lock.

The foregoing description of the operation presupposes that the knuckle 3 is not free to rotate at the time of setting the lock; but should the contrary be the case the lock-set $5^a$ will be free to vibrate to its full extent and in so doing will impart an opening impulse to the knuckle 3, which will cause it to at once assume the ultimate position shown in Figs. 9 and 10 of the drawings.

The previous description relates to the operation of the device as a lock-set and knuckle-opener. The operation of said devices as a lock to the lock, which function is only in existence at the time the parts are in a locked position, is due to the engagement of the roller-cam $5^c$ with the cam-recess $4^b$ of the lock 4 and with the interior wall $1^b$ of the coupler-head, thus constituting a roller-clutch, also to the curved form of the lock-set and knuckle-opener arm $5^a$, already noted, whereby any independent upward movement of the lock 4 tends to induce an eccentric movement of the cam $5^c$ and arm $5^a$ and a consequent locking of said parts against the walls of the coupler-head.

Having thus described my invention, what I claim, and desire to secure by Letters Patent, is—

1. In a car-coupler, the combination with a pivoted knuckle, of a gravity-lock, a sliding and rotating lock-set member engaging said gravity-lock and having an arm arranged to be seated upon the knuckle on the side opposite the lock and to travel with said knuckle, and means for unseating said lock-set member, substantially as and for the purposes specified.

2. In a car-coupler, the combination with a pivoted knuckle, of a gravity-lock having a cam-recess, a lock-set member having a cam portion arranged to slide and rotate in said cam-recess and to engage a wall of the coupler-head when the lock moves independently of said lock-set member, substantially as and for the purposes specified.

3. In a car-coupler, the combination with a pivoted knuckle having a seat upon the side thereof opposite the lock, of a lock-set member having a sliding and rotating motion, said lock-set member arranged to be seated on the knuckle and to travel therewith, a gravity-lock, and means for unseating said lock-set member, substantially as and for the purposes specified.

4. In a car-coupler, the combination with a pivoted knuckle having a seat adapted to receive a lock-set member, of a gravity-lock having a cam-recess, a lock-set member having a cam portion engaging said cam-recess of said gravity-lock and having an arm arranged to be seated upon and travel with said knuckle, and means for unseating said lock-set member, substantially as and for the purposes specified.

5. In a car-coupler, the combination with a pivoted knuckle and a gravity-lock, of a combined lock-set and knuckle-opener member arranged to be seated upon and travel with said knuckle, and means for unseating said lock-set and knuckle-opener member, substantially as and for the purposes specified.

6. In a car-coupler, the combination with a pivoted knuckle and a gravity-lock, of a combined lock-set and knuckle-opener member engaging said gravity-lock and having a sliding and rotating motion, said lock-set and knuckle-opener member being provided with an arm extending downwardly behind the knuckle on the side opposite the lock and arranged to be positively actuated by and to travel with said knuckle in its uncoupling movement after the lock is set and to be returned to its locked position by the coupling movement of said knuckle, substantially as and for the purposes specified.

7. In a car-coupler, the combination with a pivoted knuckle having a depressed lock-set seat on the side opposite the lock, of a gravity-lock having a recess adjacent to the tail of the knuckle, a lock-set member having a curved lower arm a journal portion and a lifting-arm, said lock-set member arranged to be seated upon and travel with said knuckle, and means for unseating said lock-set member, substantially as and for the purposes specified.

In testimony whereof I affix my signature, in presence of two witnesses, this 26th day of November, 1902.

GILBERT P. RITTER.

Witnesses:
H. G. DIETERICH,
JNO. R. ADAMS.